US009836041B2

(12) United States Patent
Caretta et al.

(10) Patent No.: US 9,836,041 B2
(45) Date of Patent: Dec. 5, 2017

(54) METHOD FOR MANUFACTURING ELASTOMERIC MATERIAL COMPONENTS OF A TYRE FOR VEHICLE WHEELS

(71) Applicant: PIRELLI TYRE S.P.A., Milan (IT)

(72) Inventors: Renato Caretta, Gallarate (IT); Marco Cantu, Carnate (IT); Maurizio Marchini, Seregno (IT); Ignazio De Gese, Gessate (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 15/159,695

(22) Filed: May 19, 2016

(65) Prior Publication Data

US 2016/0266569 A1    Sep. 15, 2016

Related U.S. Application Data

(63) Continuation of application No. 10/554,997, filed as application No. PCT/IT99/00376 on Nov. 19, 1999, now abandoned.

(51) Int. Cl.
*B29D 30/16* (2006.01)
*G05B 19/402* (2006.01)
(Continued)

(52) U.S. Cl.
CPC ....... *G05B 19/402* (2013.01); *B29D 30/1628* (2013.01); *B29D 30/62* (2013.01); *G05B 15/02* (2013.01); *B29D 30/60* (2013.01); *B29D 2030/082* (2013.01); *B29D 2030/1678* (2013.01); *G05B 2219/39483* (2013.01)

(58) Field of Classification Search
CPC ............ B29D 30/1621; B29D 30/1628; B29D 30/3021; B29D 30/3028; B29D 30/60; B29D 2030/082
See application file for complete search history.

(56) References Cited

U.S. PATENT DOCUMENTS 3,418,191 A * 12/1968 Dieckmann ............ B29D 30/60
156/130
4,551,806 A * 11/1985 Storace ............... B29C 53/8041
156/128.1
(Continued)

FOREIGN PATENT DOCUMENTS

GB        1048241 A  * 11/1966
GB        2147561 A  *  5/1985

*Primary Examiner* — Geoffrey L Knable
(74) *Attorney, Agent, or Firm* — Steinfl + Bruno LLP

(57) ABSTRACT

A robot arm having seven axes of actuation imparts to a toroidal support a circumferential distribution motion about its own geometric axis simultaneously with controlled transverse distribution displacements in front of a dispensing organ of a strip of elastomeric material. The strip thus forms a plurality of turns, the orientation and mutual superposition whereof are controlled in such a way as to control the thickness variations to be conferred to a component of a tire being manufactured, based on a pre-determined laying scheme pre-set on an electronic computer. The rotation of the toroidal support is controlled in such a way as to obtain a peripheral speed of application exceeding the theoretical feeding rate of the strip, able to be increased or decreased as needed to form turns with reduced or, respectively, enlarged cross section.

9 Claims, 4 Drawing Sheets

(51) Int. Cl.
*B29D 30/62* (2006.01)
*G05B 15/02* (2006.01)
*B29D 30/08* (2006.01)
*B29D 30/60* (2006.01)

(56) References Cited

U.S. PATENT DOCUMENTS

| | | | | |
|---|---|---|---|---|
| 4,750,960 A * | 6/1988 | Bubeck | ................ | B25J 15/0019 |
| | | | | 156/169 |
| 4,963,207 A * | 10/1990 | Laurent | ................... | B29C 47/92 |
| | | | | 156/117 |
| 5,117,757 A * | 6/1992 | Marks | ................... | B29C 53/581 |
| | | | | 102/287 |
| 5,942,059 A * | 8/1999 | Wulker | ................... | B29D 30/54 |
| | | | | 118/670 |
| 6,039,826 A * | 3/2000 | Okada | ................ | B29D 30/3028 |
| | | | | 156/117 |
| 2006/0096696 A1 * | 5/2006 | Oku | ........................ | B29C 47/06 |
| | | | | 156/117 |

* cited by examiner

METHOD FOR MANUFACTURING ELASTOMERIC MATERIAL COMPONENTS OF A TYRE FOR VEHICLE WHEELS

CROSS REFERENCE TO RELATED APPLICATIONS

The present application is a continuation of U.S. patent application Ser. No. 10/554,997 filed on Nov. 1, 2005, which, in turn, is the national stage entry of International Application No. PCT/IT99/00376, filed on Nov. 19, 1999.

BACKGROUND

Field

The present invention relates to a method for manufacturing elastomeric material components of a tyre for vehicle wheels, comprising the following phases: feeding a continuous elongated element from a dispensing organ positioned adjacently to a toroidal support to apply said elongated element onto the toroidal support itself; conferring to the toroidal support a rotatory circumferential distribution motion about its own geometric axis of rotation, so that the elongated element is circumferentially distributed on the toroidal support; effect controlled relative transverse distribution displacements between the toroidal support arid the dispensing organ to form with said elongated element a component of a tyre defined by a plurality of turns positioned mutually approached and/or superimposed according to a pre-determined cross section profile to be conferred to said component.

Description of the Related Art

The manufacture of tyres for vehicle wheels provides for the formation of a carcass structure essentially comprising one or more carcass plies shaped according to a substantially toroidal conformation and presenting their axially opposite lateral edges engaged to respective circumferentially inextensible annular reinforcing elements, usually called "beads rings".

On the carcass structure is applied, in radially exterior position, a belt structure comprising one or more belt layers shaped in a closed loop, essentially composed of textile or metal filaments appropriately oriented relative to each other and relative to the filaments belonging to the adjacent carcass plies.

In radially exterior position to the belt structure, a tread band is then applied, normally constituted by a strip of elastomeric material of suitable thickness.

It should be specified that, for purposes of the present description, the term "elastomeric material" indicates the rubber compound in its entirety, i.e. the set formed by at least a base polymer suitably amalgamated with reinforcing charges and process additives of various kinds.

Lastly, a pair of sidewalls is applied onto the opposite sides of the tyre being manufactured, each of which sidewalls covers a lateral portion of the tyre lying between a so-called shoulder area, located in proximity to the respective lateral edge of the tread band, and a so-called bead located in correspondence with the respective bead ring.

Traditional production methods provide essentially for the tyre components listed above first to be made separately from each other, then to be assembled in a tyre manufacturing phase.

The Applicant's current trend, however, it to employ productive methodologies which allow to minimise or, possibly, to eliminate the production and storage of semi-finished products.

In practice, the Applicant's research and development are oriented towards new process solutions that allow to produce individual components by forming them directly on the tyre being manufactured according to a pre-set sequence.

In this regard, manufacturing processes have been proposed which are aimed at obtaining determined tyre components, such as the tread band, the sidewalls others, by laying, onto a toroidal support bearing the tyre being manufactured, a continuous elongated element of elastomeric material having reduced section relative to that of the component to be obtained, and positioned to form, about the axis of rotation of the tyre, a plurality of turns consecutively approached and/or superposed thereby defining the component itself in its final configuration.

More specifically, U.S. Pat. Nos. 4,963,207 and 5,171,394 describe respectively a method and an apparatus wherein determined components of a tyre are obtained by laying on rigid toroidal support an elongated element of elastomeric material continuously fed from a dispensing organ associated to a volumetric extruder.

While the toroidal support is made to rotate about its own geometric axis, determining a circumferential distribution of the elongated element, the volumetric extruder is moved in such a way as to confer controlled displacements to the dispensing organ in a plane meridian to the toroidal support, thereby distributing the various turns formed by the continuous elongated element according to a pre-set arrangement.

U.S. Pat. No. 5,221,406 calls for the placement, around the toroidal support, of a plurality of volumetric extruders, each able to feed, by means of its own dispensing organ, a respective continuous elongated element to be selectively employed to obtain a determined component of the tyre.

The document GB 1,048,241 describes a method and an apparatus for manufacturing the sidewalls, the shoulders and the tread band of a tyre by winding a continuous ribbon-like element made of elastomeric material onto a toroidal support actuated in rotation about its own geometric axis. During the application, the toroidal support is made to rotate about an axis of revolution tangential to a median circumferential line of its profile in cross section, in such a way that the ribbon-like element is distributed on the outer surface of the toroidal support itself to form a series of turns set side by side and partially overlapping one another. The angular velocity imposed to the toroidal support about the axis of revolution is appropriately modified during the laying operation, to vary the degree of overlap of the consecutive turns and adequately to differentiate the thickness of the rubber layer formed by the turns in the different areas of the tyre.

In accordance with the present invention, it was found that if the peripheral velocity of the toroidal support in the point of application of an elongated element is controlled in such a way as to maintain a suitably greater value of the speed whereat the elongated element itself is fed by the dispensing organ, the adhesion of the applied elongated element is considerably enhanced, and considerable advantages are attained in terms of operative flexibility. In particular, the capability is achieved of suitably modifying the cross section dimensions of the elongated element to adapt it to the thickness of the component to be manufactured, in the various points of the cross section profile thereof.

SUMMARY

In particular, the subject of the present invention is a method for manufacturing elastomeric material components of a tyre for vehicle wheels, characterised in that the rotatory circumferential distribution motion is controlled according to the distance between an point of application of the elongated element onto the toroidal support and said geometric axis of rotation, to confer to the toroidal support itself, in correspondence with the application point, a peripheral speed of application having a nominal value that is greater and directly proportional relative to a theoretical rate of feeding of the elongated element by said dispensing organ.

It is also preferably provided that, during the application of the elongated element on the toroidal support, a programmed control of the cross section dimensions of the elongated element is effected, modifying the peripheral application velocity with respect to said nominal value.

In particular, for this purpose during the distribution of the elongated element on the toroidal support, at least one acceleration phase could be executed, wherein the peripheral speed of application is increased relative to the nominal value to cause a reduction in the cross section of the elongated element.

It could further be provided that during the distribution of the elongated element on the toroidal support, at least a deceleration phase be executed wherein the peripheral speed of application is reduced relative to the nominal value to cause a bulging of the cross section of the elongated element.

In a possible preferential embodiment, said dispensing organ comprises an extruder having an outlet port traversed by the elongated element, said peripheral speed of application presenting a nominal value essentially equal to an exit velocity of the elongated element itself through said outlet port.

In accordance with a further aspect of the present invention, the Applicant has noted that the thickness of the component during the manufacturing phase can advantageously be controlled according to the geometric characteristics to be conferred to the component itself, using an elongated element with flattened section and appropriately modifying its orientation assumed relative to the outer surface of the toroidal support, simultaneously with the circumferential distribution motion and the transversal distribution motion imparted thereto.

Therefore a further subject of the present invention is a method for manufacturing elastomeric material components of a tyre for vehicle wheels, wherein said elongated element presents a substantially flattened cross section profile, and wherein the orientation of the elongated element with respect to an outer surface of the toroidal support, in correspondence with the point of application, is modified in conjunction with said transverse distribution relative displacement to control the thickness of the component during the manufacturing phase.

Also in accordance with the present invention, controlled mutual orientation movements are preferably effected between the dispensing organ and the toroidal support to provide the elongated element with a pre-determined orientation relative to a laying surface presented by the toroidal support in correspondence with the application point.

More in particular, the orientation of the elongated element is preferably maintained substantially parallel to said laying surface.

It is further preferably provided for the orientation of the elongated element with respect to said outer surface to be modified by controlling the degree of overlap of the elongated element on at least one turn previously formed by it.

Additionally or alternatively, the orientation of the elongated element relative to said outer surface can be modified by means of said controlled mutual orientation movements.

In a preferential embodiment of the invention, the rotatory circumferential distribution motion and the relative transversal distribution displacements are effected by means of a robot arm bearing the toroidal support. In detail, it is preferably provided for the relative transversal distribution displacements to be effected by moving the toroidal support according to at least six axes of oscillation.

In accordance with a further inventive aspect, the laying scheme for the turns formed by the elongated element can be pre-determined on an electronic computer through the following phases: storing the cross section profile of at least an elastomeric material component; storing the cross section profile of said elongated element; projecting the cross section profile of the elongated element into the cross section profile of the component; replicating the projection of the cross section profile of the elongated element, in approach and at least partial superposition to the previously profile, repeatedly until occupying substantially the entire section of the cross section profile of the component; storing the number and position of the cross section profiles of the elongated element projected into the cross section profile of the component, to define a working program to be employed to control said rotatory circumferential distribution motion and said relative transverse distribution displacements.

In yet a different aspect, the invention proposes a method for manufacturing a tyre, characterised in that each of the following phases is executed at least once: a) laying pre-cut sections of a strip-shaped element along a direction perpendicular to an axis of rotation of the tyre; b) laying a continuous elongated element in a circumferential direction of the tyre and cutting said element after its laying.

Advantageously, said phase b) is preferably carried out in accordance with the description provided above.

BRIEF DESCRIPTION OF THE DRAWINGS

Further features and advantages shall become more readily apparent from the detailed description of a preferred, but not exclusive, embodiment of a method for manufacturing elastomeric material components of a tyre for vehicle wheels, according to the present invention. The description shall be provided hereafter with reference to the accompanying drawings, provided purely by way of non-limiting indication, wherein.

DETAILED DESCRIPTION

Figure 1:
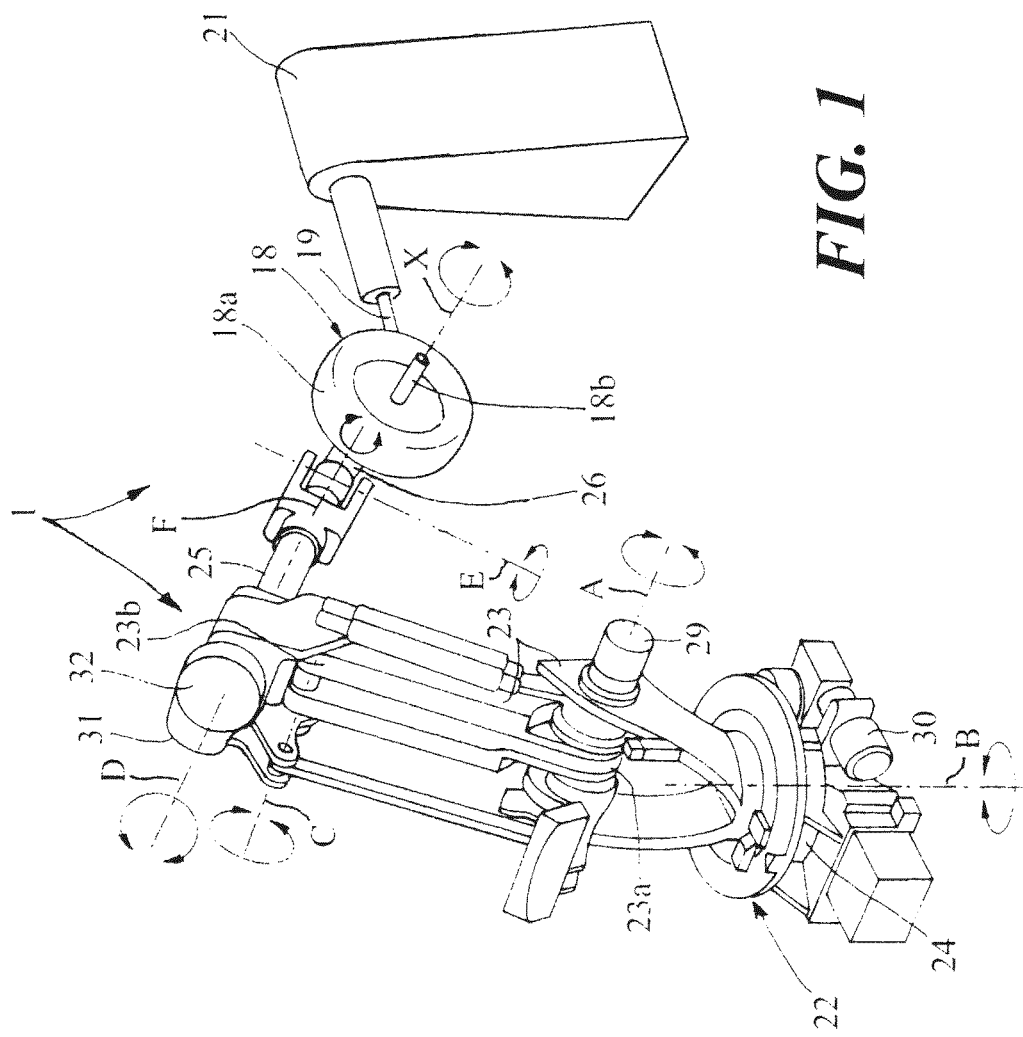
FIG. 1 schematically shows a perspective view of an apparatus according to the invention.

With reference to FIG. 1, the number 1 indicates in its entirety an apparatus able to manufacture elastomeric components of tyres for vehicle wheels, implementing a method in accordance with the present invention.

Figure 4:
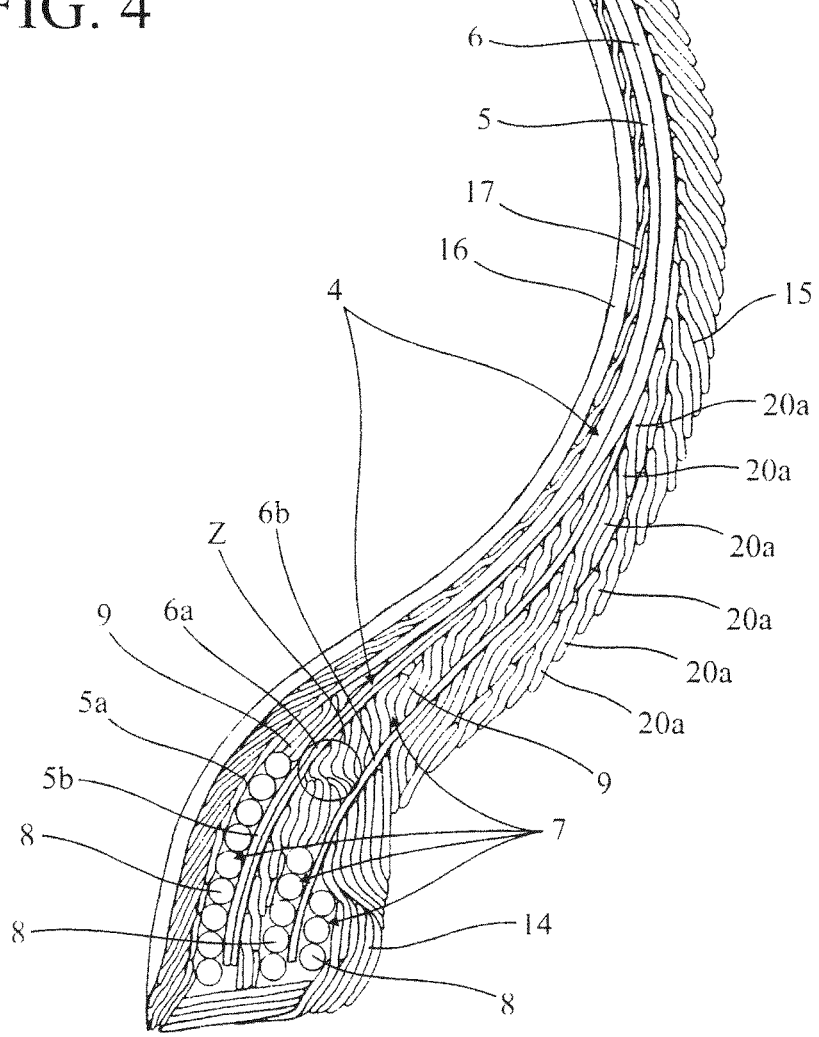
FIG. 4 is an interrupted cross section of a raw tyre manufactured according to a method in accordance with the present invention.

By way of indication, a pneumatic which can be manufactured in accordance with the present invention is indicated overall with the number 3 in FIG. 4, and essentially comprises a carcass structure 4 formed by one or more carcass plies 5, 6 having their respective opposite terminal edges engaged to annular reinforcing structures 7 (only one of which is visible in the accompanying figure) integrated in the interior circumferential areas of the tyre 3, usually identified by the name of "beads". Each annular reinforcing structure 7 comprises one or more circumferentially inextensible annular inserts 8 and one or more filling inserts 9 coupled to the carcass plies 5, 6.

In a position radially exterior to the carcass structure 4 is applied a belt structure 10 comprising one or more belt layers 11 having respectively crossed reinforcing filaments, and a possible auxiliary belt layer 11a comprising one or more textile material filaments wound in a spiral about the geometric axis of the tyre 3. Between each of the lateral edges of the belt structure 10 and the carcass structure 4 is interposed an under belt strip 12.

The tyre 3 further comprises a tread band 13 applied in a position radially exterior to the belt structure 10, a pair of anti-abrasive inserts 14 each applied externally in proximity to one of the beads of the tyre, and a pair of sidewalls 15 each of which covers the carcass structure 4 in a laterally external position.

The carcass structure 4 can be internally covered by a so-called "liner" 16, i.e. a thin layer of elastomeric material which, when the vulcanisation process is complete, shall be impermeable to air in order to assure that the inflation pressure of the tyre is maintained in use. Between the liner 16 and the carcass plies 5, 6 can also be interposed a so-called under-liner 17 of elastomeric material.

The apparatus 1 is suitable to be included in a plant, not shown herein, used for manufacturing tyres for vehicle wheels, or for conducting a part of the work processes comprised in the manufacturing cycle of the tyres themselves.

Within the scope of said work processes, it may be advantageously provided for all components of the tyre 3 undergoing production to be manufactured directly on a rigid toroidal support 18 presenting an outer surface 18a substantially shaped according to the internal configuration of the tyre itself.

For this purpose, the plant generally comprises a plurality of work stations (not shown herein) each dedicated to the execution of at least one of the work processes aimed at manufacturing the tyre on the toroidal support. For instance, there could be a first work station wherein the liner 16 and the under-liner 17 are manufactured, a second work station wherein the carcass structure 4 is manufactured with the respective annular reinforcing structures 7, a third station where the belt structure 10 is manufactured together with respective under-belt inserts 12, a fourth station where the tread band 13 is manufactured and a fifth work station where the anti-abrasive inserts 14 and the sidewalls 15 are manufactured.

Such a plant is for instance described in European Patent application no. 99830685.6, in the name of the same Applicant.

Within the scope of the manufacture of the tyre 3, each carcass ply 5,6 can advantageously be formed by means of sequential laying of pre-cut strip-shaped elements 5a, 5b, 6a, 6b consecutively set side by side in mutual circumferential approach on the outer surface 18a of the toroidal support 18. Further details about the procedure for manufacturing the carcass ply or plies 5, 6 are amply described in European patent applications no. 97830731,2, 97830733.8 and 98830662.7, in the name of the same Applicant.

Also each of the belt lavers 11 can be manufactured by the sequential laying of strip-shaped segments consecutively set side by side in mutual circumferential approach in such o a way as to present the respective reinforcing filaments appropriately oriented relative to each other and to the filaments of the underlying carcass plies 5, 6, as described for instance in European patent application no. 97830632.2, in the name of the same Applicant.

The inextensible annular inserts 8 can in turn be manufactured as described in European patent application no. 98830762.5, also in the name of the same Applicant.

One or more apparatuses 1 may be associated to the various work stations to form, in accordance with the subject method, one or more of the elastomeric material components of the tyre 3, such as the filling inserts 9 of the annular reinforcing structures 7, the under belt strips 12, the tread band 13, the anti-abrasive inserts 14, the sidewalls 15, the liner 16 and the under-liner 17.

Figure 2:
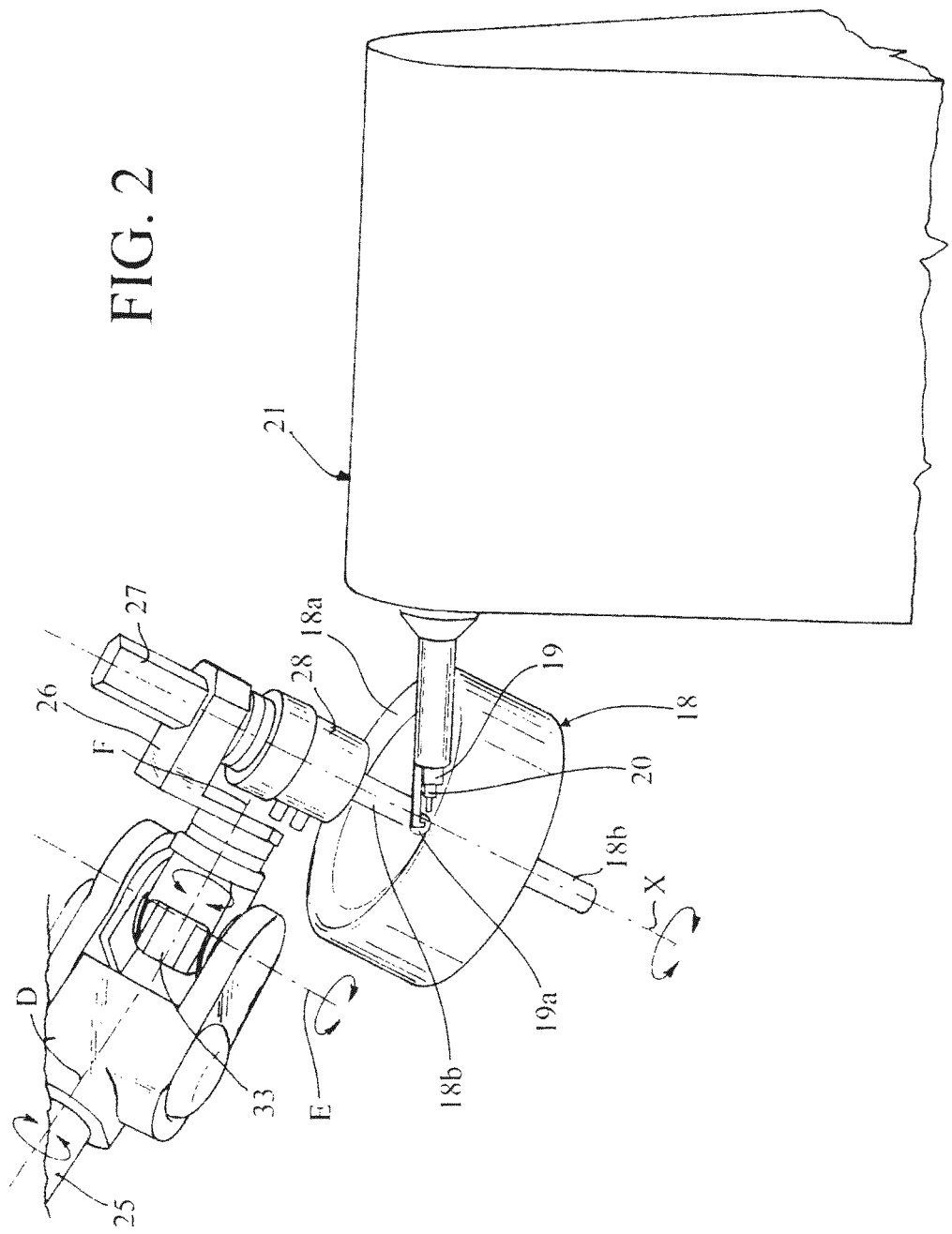
FIG. 2 shows, in enlarged scale with respect to FIG. 1, the terminal head of the robot arm during the application of an elongated element in an area proximate to one of the beads of the tyre to be manufactured.
Figure 3:
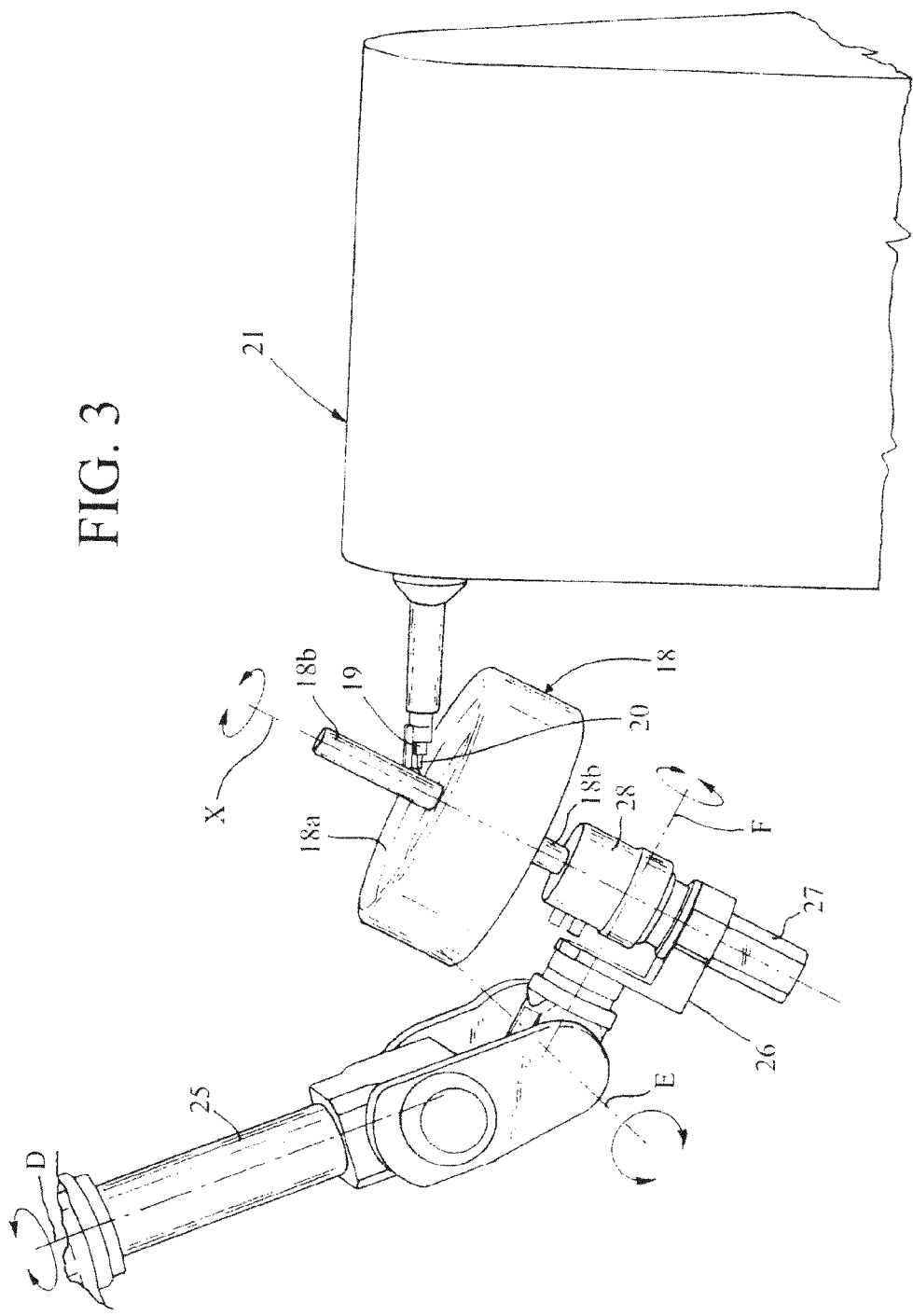
FIG. 3 shows a terminal head of the robot arm as it lays an elongated element in an area proximate to the opposite bead front the one in FIG. 2.

As shown in FIGS. 1 through 3, the apparatus 1 comprises at least a dispensing organ 19 set to operate adjacently to the toroidal support 18 to feed at least a continuous elongated element 20 against the outer surface 18a of the toroidal support itself.

In a preferential embodiment, the dispensing organ 19 is essentially defined by an extruder set to operate in the immediate vicinity of the toroidal support 18 to dispense the continuous elongated element 20 directly against the outer surface 18a, or against the component previously formed or being formed on the toroidal support.

It is specified that, for purposes of the present description, the term "extruder" refers to the part of an extrusion apparatus 21 identified in the art also by the term in "extrusion head", provided with a so-called "die" traversed by the product undergoing work in correspondence with an outlet port shaped and dimensioned according to the geometric and dimensional characteristics to be conferred to the product itself.

To the extruder 19 can be associated a pressing roller 19a positioned immediately downstream of the outlet port and ready to act elastically against the elongated element 20 dispensed to facilitate its adhesion on the toroidal support 18.

Alternatively, the extruder can be readied to operate at a certain distance from the toroidal support 18 and the dispensing organ 19 can for instance comprise a device with motorised rollers operating on the toroidal support 18 to apply the elongated element 20 onto the outer surface 18. In this case, in the segment lying between the dispensing organ 19 and the extruder, the elongated element 20 can form a festoon whose amplitude is controlled to co-ordinate, instant by instant, the linear quantity of elongated element 20 applied onto the toroidal support in a given time interval with the linear quantity of product dispensed by the extruder.

The continuous elongated element 20 is preferably constituted by a strip of elastomeric material with flattened section, for instance rectangular, elliptic or lenticular, whose cross section dimensions are considerably lesser than the cross section dimensions of the component 9, 12, 13, 14, 15, 16, 17 to be manufactured. By way of example, the continuous elongated element 20 may present a width indicatively ranging between 3 millimetres and 15 millimetres and a thickness indicatively ranging between 0.5 millimetres and 1.2 millimetres.

The component 9, 12, 13, 14, 15, 16, 17 in its final configuration is obtained by dispensing the elongated element 20 onto the toroidal support 18 while the latter is actuated with a rotatory circumferential distribution motion about its own geometric axis of rotation indicated as "X", such as to cause the elongated element itself to be distributed circumferentially.

Simultaneously with the rotation imposed to the toroidal support 18, devices or other convenient transverse distribution means which shall be described better hereafter effect controlled relative displacements between the toroidal support itself and the dispensing organ 19, in such a way that the elongated element 20 forms a series of turns 20a radially and/or axially approached according to a laying scheme set beforehand as a function of a predetermined cross section profile to be conferred to the component 9, 12, 13, 14, 15, 16, 17 being manufactured.

In accordance with a preferential embodiment of the present invention, both the rotatory circumferential distribution motion, i.e. the rotation of the toroidal support 18 about its own axis "X", and the controlled relative transverse distribution displacements are achieved by moving the toroidal support 18 directly.

For this purpose, it is provided for the devices tasked with actuating the rotation of the toroidal support 18 about its own axis "X", and the devices tasked with effecting the transverse distribution displacements to be integrated in a robot arm indicated in its o entirety with the reference number 22, able removably to engage the toroidal support 18 to carry it sequentially in front of each of the work stations provided in the aforementioned plant and suitably to move it in front of the respective dispensing organs 19.

In particular the robot arm 22, preferably of the anthropomorphic kind with seven axes, comprises a first section 23 presenting a first extremity 23a pivotingly connected to a support platform 24 according to a first axis of oscillation "A" positioned horizontally, and a second axis "B" positioned vertically or in any case perpendicular to the first axis of oscillation "A".

The robot arm 22 further comprises a second section 25 fastened to a second extremity 23b of the first section 23, with the possibility of oscillating about a third axis "C", preferably parallel to the first axis "A", as well as about a fourth axis of oscillation "D" perpendicular to the third axis "C" and preferably positioned longitudinally to the second section itself.

Terminally to the second section 25 is operatively associated a terminal head 26 able to engage removably and preferably in overhang the toroidal support 18. To the terminal head 26 are associated the aforesaid circumferential distribution devices, constituted for instance by a first motor 27 which sets in rotation a grip element 28 able removably to engage the toroidal support 18 in correspondence with an attachment tang 18b coaxially projecting from at least of the opposite sides thereof.

The terminal head 26 is further able to oscillate about a fifth axis "E", perpendicular with respect to the fourth axis of oscillation "D".

In a preferential embodiment, the fifth axis "E" is coplanar with the fourth axis "D", and the terminal head 26 is also able to oscillate about a sixth axis "F" perpendicularly oriented relative to the toroidal support 18 as well as relative to the fifth axis of oscillation "E".

The movements of the first section 23, of the second section 25, and of the terminal head 26 about the respective axes of oscillation "A", "B", "C", "D", "E"; "F" are controlled by respective motors, whereof only the motors assigned to actuation about the first, the second, the third, the fourth and the sixth axis are visible, indicated respectively as 29, 30, 31, 32 and 33.

The motor not shown herein, assigned to the actuation about the fifth axis "E", as well as all other motors may be constructed in any convenient manner by the person versed in the art.

The operation of all motors associated with the transverse distribution means, as well as of the motor 27 associated with the circumferential distribution means, is controlled by a programmable governing electronic unit (not shown) in such a way as to assure the proper actuation of the toroidal support 18 in front of the dispensing organ 19 for purposes of forming the desired component 9, 12, 13, 14, 15, 16, 17 of the tyre 3.

In accordance with a further aspect of the present invention, the laying scheme of the turns 20a formed the elongated element 20 for purposes of manufacturing a given component 9, 12, 13, 14, 15, 16, 17 can be advantageously pre-determined on an electronic computer.

For this purpose, the cross section profile of the component 9, 12, 13, 14, 15, 16, 17 to be manufactured is stored in the electronic computer. More specifically, this storage phase can be completed by executing with the aid of the computer the drawing of the whole tyre 3, with the individual components thereof defined as mutually distinct units, selectable individually for subsequent processing.

Moreover, the cross section profile of the elongated element 20 to be used is to be stored in the computer. This profile, as well, can be drawn directly by means of the electronic computer.

The cross section profile of the elongated element 20 is then projected inside the cross section profile of the component 9, 12, 13, 14, 15, 16, 17, preferably causing one of the greater sides of the profile of the elongated element to coincide with a side of the component oriented towards the interior of the tyre.

The profile of the elongated element 20 is then replicated in approach and/or superposition, at least partial, to the previously projected profile. This phase is reiterated repeatedly until the entire cross section profile of the component is substantially occupied by the profiles of the elongated element 20 reiterated in its interior. The reiterated replication of the profile of the elongated element 20 can advantageously be performed directly by the electronic computer, suitably programmed with an appropriate computational algorithm that adapts the orientation and mutual disposition of the profiles in such a way as to obtain the maximum tilling of the cross section of the component, without thereby causing the profiles of the elongated element to overflow outside the section itself beyond a pre-set limit.

In particular, the orientation of the profiles of the elongated element 20 is also controlled as a function of the thickness variations presented by the cross section of the component in different areas thereof.

In practice, the computation algorithm is able to compute the exact disposition of the individual turns 20 which the elongated element 20 shall have to form following its winding on the toroidal support 18, according to the simplified diagram in FIG. 4, thereby elaborating a work program to be used to control the rotatory circumferential distribution motion and the relative transverse distribution displacements to be obtained under the action of the robot arm 22.

In accordance with a further aspect of the present invention, during the laying of the elongated element 20 on the longitudinal support 18, the orientation of the elongated element itself relative to the outer surface 18a or other suitable reference surface is appropriately modified in conjunction with the relative transverse distribution displacement, to control the thickness of the component 9, 12, 13, 14, 15, 16, 17 during the manufacturing stage.

It should be specified that, for purposes of the present description, any consideration about the orientation of the elongated element 20 refers to the main axis of the development of the flattened profile presented in cross section by the elongated element itself.

Generally, as FIG. 4 clearly shows, the component 9, 12, 13, 14, 15, 16, 17 will present a maximum thickness wherever the turns 20a formed by the elongated element 20 present a substantially normal orientation to the outer surface 18a of the toroidal support 18. Conversely, minimum values of thickness are attained when the turns present substantially tangential orientation with respect to the exterior surface 18a.

The orientation of the elongated element 20, and more in particular of the turns 20a formed thereby, relative to the outer surface 18a can advantageously be modified by controlling, instant by instant, the degree of overlap of the elongated clement 20 on the turn 20a previously formed thereby. Generally, as FIG. 4 shows, the greater the degree of superposition, the greater the tendency of the elongated element 20 to form turns 20a oriented normally to the outer surface 18a.

Additionally, through the transverse actuation devices associated to the robot arm 22, controlled mutual orientation movements are effected between the dispensing organ 19 and the toroidal support 18, to confer to the elongated element 20 a pre-set orientation with respect to a laying surface presented by the toroidal support 18 in correspondence with the point of application of the elongated element itself. For the sake of greater clarity, it should be specified that the laying surface is not necessarily represented by the outer surface 18a of the toroidal support 18, but rather any surface presented by a component of the tyre 3 or by previously laid turns 20a, whereon the elongated element 20 bears in the point of application. For instance, in the area indicated "Z" in FIG. 4, the laying surface is represented in part by previously laid aims 20a, and in part by the strip-shaped element 6a of the second carcass ply 6.

Preferably, the orientation of the elongated element 20 is constantly maintained substantially parallel to the laying surface, so that the elongated element itself is substantially laid "flat" on the turns 20a previously laid and/or on the previously formed components of the tyre 3.

The aforesaid controlled mutual orientation movements can also be exploited to control the orientation of the elongated element 20 relative to the outer surface 18a of the toroidal support 18.

It should be observed that the ample freedom of motion provided the toroidal support 18 according to the six axes of oscillation "A", "B", "C", "D", "E"; "F" as well as the rotating actuation thereof about the geometric axis "X" allow to effect the proper laying of the elongated clement 20 coming from the dispensing organ 19 irrespective of the conformation of the toroidal support 18 and of the component 9, 12, 13, 14, 15, 16, 17 to be obtained.

The rotatory circumferential distribution motion imparted to the toroidal support 18 is constantly controlled, in terms of angular velocity, according to the distance between the point of application of the elongated element 20 and the geometric axis of rotation X. In particular, the angular velocity of rotation is controlled in such a way that the toroidal support 18 presents, in correspondence of the application point, a peripheral speed of application that is constantly controlled according to the feeding rate of the elongated element 20 by the dispensing organ 19.

More specifically, in accordance with a further aspect of the present invention, it is provided for the peripheral speed of application to present a nominal value that is constantly greater and directly proportional with respect to a theoretical feeding rate of the elongated element 20 by the dispensing organ 19.

It should be specified that, for purposes of the present description, the term "theoretical feeding rate" means the linear quantity of elongated element 20 provided over the unit of time by the dispensing organ 19, measured in the absence of internal tensions on the elongated elements itself.

This definition should be kept in mind especially in the case wherein, as in the illustrated embodiment, the dispensing organ 19 is constituted by an extruder which lays the elongated element directly onto the surface 18a of the drum 18. In this case, the theoretical feeding rate of the elongated element 20 is the one that would be obtained downstream of the extruder if the elongated element itself were not subjected to the drawing action by the toroidal support 18. In the absence of this drawing action, circumstance which does take place for instance in the presence of a festoon between the extruder and the dispensing organ, the elongated element 20, prior to reaching the dispensing organ itself, undergoes a certain bulging with the consequent increase of its cross section.

Therefore, the value of the theoretical feeding rate is lesser than the value of speed measurable on the elongated element itself in correspondence with the outlet port of the extruder.

Preferably, the nominal value of the peripheral speed of application is greater than the theoretical feeding rate according to a measure not exceeding 20%, thereby determining a corresponding longitudinal tensioning action on the elongated element 20. More specifically, the application speed is maintained substantially equal to the exit velocity of the elongated element through the outlet port of the extruder, measurable in the immediate vicinity of the outlet port itself. In this way, the cross section dimensions of the elongated element laid on the toroidal support 18 remain substantially identical to those of the output port of the extruder. This allows considerably to simplify the preparation of the computing algorithms to be employed to program the laying scheme of the turns during the design phase.

Maintaining application speed at a value greater than theoretical feeding rate also guarantees an optimal adhesion of the elongated element against the outer surface 18a of the toroidal support 18.

It is also advantageously possible to modify, if need be, be peripheral application speed relative to the nominal value in order to effect a programmed control over the cross section dimensions of the elongated element 20. In particular, it is possible to increase application speed with respect to the nominal value to obtain a thinning of the elongated element 20 so as to form turns 20a with reduced section in the points wherein the cross section profile of a component is particular thin, as takes place for instance in correspondence with the apexes presented by the filler inserts 9 in correspondence with their radially exterior edges. It is also possible to reduce the application speed relative to the nominal value, whenever it is desired to obtain turns 20a with increased cross section by effect of the consequent bulging of the cross section of the elongated element.

The present invention attains important advantages.

The subject method allows to form structural elements even with complex configurations, having different thickness variations, always using a same elongated element. In particular, the control over the rotating speed of the toroidal support effected according to the present invention allows to adapt the section dimensions of the elongated element according to the thickness required on the obtained component. Also the control over the orientation of the laid turns relative to the outer surface of the toroidal support allows to obtain considerable thickness variations.

It should further be noted that, by applying, the elongated element "flatly" as described above, one advantageously avoids imposing any transverse sliding of the elongated element on the previously laid turns, sliding which would be impossible to effect correctly due to the natural stickiness of the raw elastomeric material.

It should further be noted that the robot arm is suitable to be exploited both to control the actuation of the toroidal support in front of the dispensing organ or organs provided in a work station, and to determine the sequential transfer of the toroidal support itself inside the work station and/or from a work station to another.

It is therefore advantageously possible to effect the complete working cycle of the tyre by forming all its components on the same toroidal support, sequentially transferred between the different work stations by means of one or more robot arms which also actuate toroidal support itself for purposes of forming the individual components of the tyre itself.

The entire working cycle can advantageously be conducted using exclusively the two following fundamental phases, each whereof is executed at least once during the manufacture of the tyre:

a) laying pre-cut segments of a strip-shaped element along a direction perpendicular to the axis of rotation of the tyre;

b) laying at least a continuous elongated element in the circumferential direction of the tyre to cut said element after its laying.

In the embodiment described above, phase a) is effected in the manufacture of the carcass plies 5, 6 and of the belt layers 11. Phase b) in turn is effected to manufacture all other components of the tyre, such as the tread band 13, the sidewalls 15, the annular reinforcing structures 7 and all other filler elements provided in the structure of the tyre 3, as described above.

What is claimed is:

1. A method for manufacturing elastomeric material components of a tyre for vehicle wheels, wherein a predetermined laying arrangement of turns formed by an elongated element and a subsequent manufacture are controlled by an electronic computer, the method comprising:

i) storing, in the electronic computer, a predetermined cross section profile of at least one elastomeric material component;

ii) storing, in the electronic computer, a cross section profile of said elongated element, wherein the cross section profile of said elongated element is substantially flattened;

iii) projecting the cross section profile of the elongated element into the cross section profile of the at least one elastomeric material component;

iv) radially and axially applying, within the cross section profile of said at least one elastomeric material component, a plurality of projected cross section profiles of the elongated element, by partially overlapping adjacent projected cross section profiles, repeatedly until occupying substantially an entire section of the cross section profile of the at least one elastomeric material component;

v) storing number and position of each projected cross section profile of the elongated element to define a working program to be employed to control rotatory circumferential distribution motion and relative transverse distribution displacements;

based on said i)-v), automatically performing:

vi) feeding said elongated element from a dispensing organ positioned adjacent a toroidal support to apply said elongated element onto the toroidal support, the toroidal support comprising an attachment tang configured to detachably attach to a robotic arm having six axes of oscillation;

vii) imparting to the toroidal support, by the robotic arm, the rotatory circumferential distribution motion about its own geometric axis of rotation according to the working program of said v), so that the elongated element is circumferentially distributed on the toroidal support;

viii) by the robotic arm, effecting controlled relative displacements for transverse distribution between the toroidal support and the dispensing organ to form with said elongated element said at least one elastomeric material component of the tyre defined by a plurality of turns laid in radial and axial application to the toroidal support and to a previously applied turn of the elongated element, according to a laying arrangement preset according to the working program of said v) as a function of the predetermined cross section profile to be conferred to said at least one elastomeric material component;

ix) varying the rotatory circumferential distribution motion according to variations of a distance between a point of application of the elongated element onto:

a) the toroidal support and said geometric axis of rotation, or b) the previously applied turn of the elongated element and said geometric axis of rotation, to confer to the toroidal support, in correspondence with the point of application, a peripheral speed of application whose nominal value exceeds, and is directly proportional to, a theoretical feeding rate of the elongated element by said dispensing organ;

x) modifying the peripheral speed of application relative to said nominal value and said theoretical feeding rate during the application of the elongated element onto the toroidal support according to the working program of said v), to provide preplanned variation in the cross section area of the elongated element, wherein the pre-determined cross section profile of the at least one elastomeric material component comprises at least one thicker portion and at least one thinner portion planned according to the working program of said v), and wherein modifying the peripheral speed of application comprises increasing the peripheral speed of application according to the working program of said v) based on the pre-determined cross section profile of the at least one elastomeric material component to provide at least one turn of the elongated element having a preplanned reduction in cross sectional area in the at least one thinner portion of the at least one elastomeric material component;

xi) orienting, by the robotic arm, the elongated element with respect to a laying surface of the toroidal support between a normal orientation and a tangential orientation, wherein a maximum thickness is obtained by orienting the elongated element normally to the laying surface of the toroidal support, and a minimum thickness is obtained by orienting the elongated element tangentially to the laying surface of the toroidal support;

xii) moving, by the robotic arm, the toroidal support from a first work station to a second work station of a plurality of work stations, each work station comprising one or more corresponding dispensing organs; and xiii) manufacturing on the same toroidal support, by repeating steps vi-xii, the at least one elastomeric material component, the at least one elastomeric material component being a plurality of elastomeric material components, including a liner, an underliner, a tread band, anti-abrasive inserts, and sidewalls, wherein the robotic arm comprises:
- a first axis of oscillation A positioned horizontally;
- a second axis of oscillation B perpendicular to the first axis A;
- a third axis of oscillation C parallel to the first axis A;
- a fourth axis of oscillation D perpendicular to the third axis C and longitudinally within a section of the robotic arm extending towards the toroidal support; and
- a terminal head configured to oscillate about a fifth axis E perpendicular to the fourth axis of oscillation D, the fifth axis E being co-planar with the fourth axis D, the terminal head configured to oscillate about a sixth axis F perpendicularly oriented relative to the toroidal support as well as relative to the fifth axis of oscillation E.

2. The method of claim 1, wherein the plurality of elastomeric material components comprise at least one first elastomeric material component on a radially inner surface of a carcass structure, and at least one second elastomeric material component on a radially outer surface of the carcass.

3. The method of claim 2, wherein the storing of the predetermined cross section profile of the plurality of elastomeric components comprises storing a computer aided drawing of the tyre, wherein the plurality of elastomeric components are defined as mutually distinct units, individually selectable for processing.

4. The method of claim 3, wherein the liner and underliner are manufactured in a first work station, the carcass structure is manufactured in a second work station, a belt structure is manufactured in a third work station, the tread band is manufactured in a fourth work station, and the anti-abrasive inserts and the sidewalls are manufactured in a fifth work station.

5. The method of claim 4, wherein:
the carcass structure and the belt structure are manufactured by laying pre-cut segments of a strip-shaped element; and
the plurality of elastomeric material components are manufactured by laying the elongated element according to steps vi-xi, wherein the elongated element is a continuous elongated element, and by cutting the continuous elongated element, after its laying.

6. The method of claim 5, wherein the cross section profile of the elongated element is rectangular, elliptic, or lenticular.

7. The method of claim 6, wherein the dispensing organ includes a pressing roller, positioned downstream of an outlet port, the roller acting elastically against the elongated element to facilitate adhesion on the toroidal support.

8. The method of claim 7, wherein step xiii) further includes manufacturing, on the same toroidal support, by repeating steps vi-xii, filling inserts and underbelt strips.

9. The method of claim 8, wherein one or more robotic arms are associated with each work station to transfer the toroidal support from a work station to another work station.

* * * * *